US012493533B2

(12) United States Patent
Fang et al.

(10) Patent No.: US 12,493,533 B2
(45) Date of Patent: Dec. 9, 2025

(54) AUTOMATED FAILSAFE DATA RECOVERY

(71) Applicant: Snowflake Inc., Bozeman, MT (US)

(72) Inventors: Yi Fang, Kirkland, WA (US); Kedar Nitin Shah, Sammamish, WA (US); Yantao Song, Sammamish, WA (US)

(73) Assignee: Snowflake Inc., Bozeman, MT (US)

( * ) Notice: Subject to any disclaimer, the term of this patent is extended or adjusted under 35 U.S.C. 154(b) by 146 days.

(21) Appl. No.: 18/192,269

(22) Filed: Mar. 29, 2023

(65) Prior Publication Data
US 2024/0330124 A1   Oct. 3, 2024

(51) Int. Cl.
G06F 11/14     (2006.01)
G06F 16/22     (2019.01)

(52) U.S. Cl.
CPC ...... *G06F 11/1469* (2013.01); *G06F 16/2282* (2019.01); *G06F 2201/80* (2013.01); *G06F 2201/835* (2013.01)

(58) Field of Classification Search
CPC ............. G06F 11/1469; G06F 16/2282; G06F 2201/80; G06F 2201/835
See application file for complete search history.

(56) References Cited

U.S. PATENT DOCUMENTS

| | | | | |
|---|---|---|---|---|
| 10,108,687 | B2 * | 10/2018 | Dornemann | ........ G06F 16/1827 |
| 10,824,519 | B2 * | 11/2020 | Heidel | ............. G06F 16/24553 |
| 11,966,614 | B2 * | 4/2024 | Yung | ..................... G06F 3/0685 |
| 2007/0156985 | A1 | 7/2007 | Tsai et al. | |
| 2009/0276661 | A1 * | 11/2009 | Deguchi | ............. G06F 11/1471 714/18 |
| 2014/0156603 | A1 * | 6/2014 | Zhao | ....................... G06F 16/27 707/674 |
| 2017/0336999 | A9 | 11/2017 | Hasegawa et al. | |
| 2017/0371751 | A1 * | 12/2017 | Berger | ................ G06F 11/1469 |
| 2023/0367679 | A1 | 11/2023 | Son | |

FOREIGN PATENT DOCUMENTS

| | | |
|---|---|---|
| CN | 105302667 | 5/2018 |
| WO | 2024206134 | 10/2024 |

OTHER PUBLICATIONS

Felix, Dealing with Deletes in the Data Warehouse. LeapFrogBI. (Year: 2013).*

(Continued)

*Primary Examiner* — Michael Maskulinski
*Assistant Examiner* — Kayo Lisa Rusin
(74) *Attorney, Agent, or Firm* — Schwegman Lundberg & Woessner, P.A.

(57) ABSTRACT

Provided herein are systems and methods for configuring data recovery. A method includes decoding, by at least one hardware processor, a request to recover historical table data. The request is received from an account of a data provider. The historical table data includes a plurality of partition files. Each of the plurality of partition files includes a deleted file designation. Based on the request, a recovery process of the plurality of partition files is performed to obtain recovered partition files. A schema associated with the historical table data is retrieved. Metadata corresponding to the retrieved schema is generated. The metadata is associated with the recovered partition files to recover the historical table data.

30 Claims, 13 Drawing Sheets

(56) References Cited

OTHER PUBLICATIONS

Record Locking (Wikipedia: The Free Encyclopedia) (Year: 2022).*
Gonzalez-Campos ("Secure Groups: Enhanced Management of Encrypted Data in Databases" IEEE) (Year: 2006).*
Amazon S3 User Guide ("Expiring objects" section, saved by the Wayback Machine in 2021, accessed on Jul. 29, 2025), https://web.archive.org/web/20210415112154/https://docs.aws.amazon.com/AmazonS3/latest/userguide/intro-lifecycle-rules.html (Year: 2025).*
"International Application Serial No. PCT US2024 021116, International Search Report mailed May 28, 2024", 3 pages.
"International Application Serial No. PCT US2024 021116, Written Opinion mailed May 28, 2024", 6 pages.
Meng, "bring2lite: A Structural Concept and Tool for Forensic Data Analysis and Recovery of Deleted SQLite Records", Digital Investigation, vol. 29, Supplement, [Online]. Retrieved from the Internet: URL: https: www.sciencedirect.com science article pii S1742287619301677 pdfft?md5=41fc25580b9ccf3a77ea4749ce4909faandpid=1-s2.0-S1742287619301677-main.pdf, (Jul. 2019), 12 pages.

\* cited by examiner

AUTOMATED FAILSAFE DATA RECOVERY

TECHNICAL FIELD

Embodiments of the disclosure relate generally to data recovery configurations and, more specifically, to techniques for automated failsafe data recovery in a database system.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed. However, databases can be susceptible to extreme operational disasters causing data loss, which can be time-consuming and challenging to recover.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
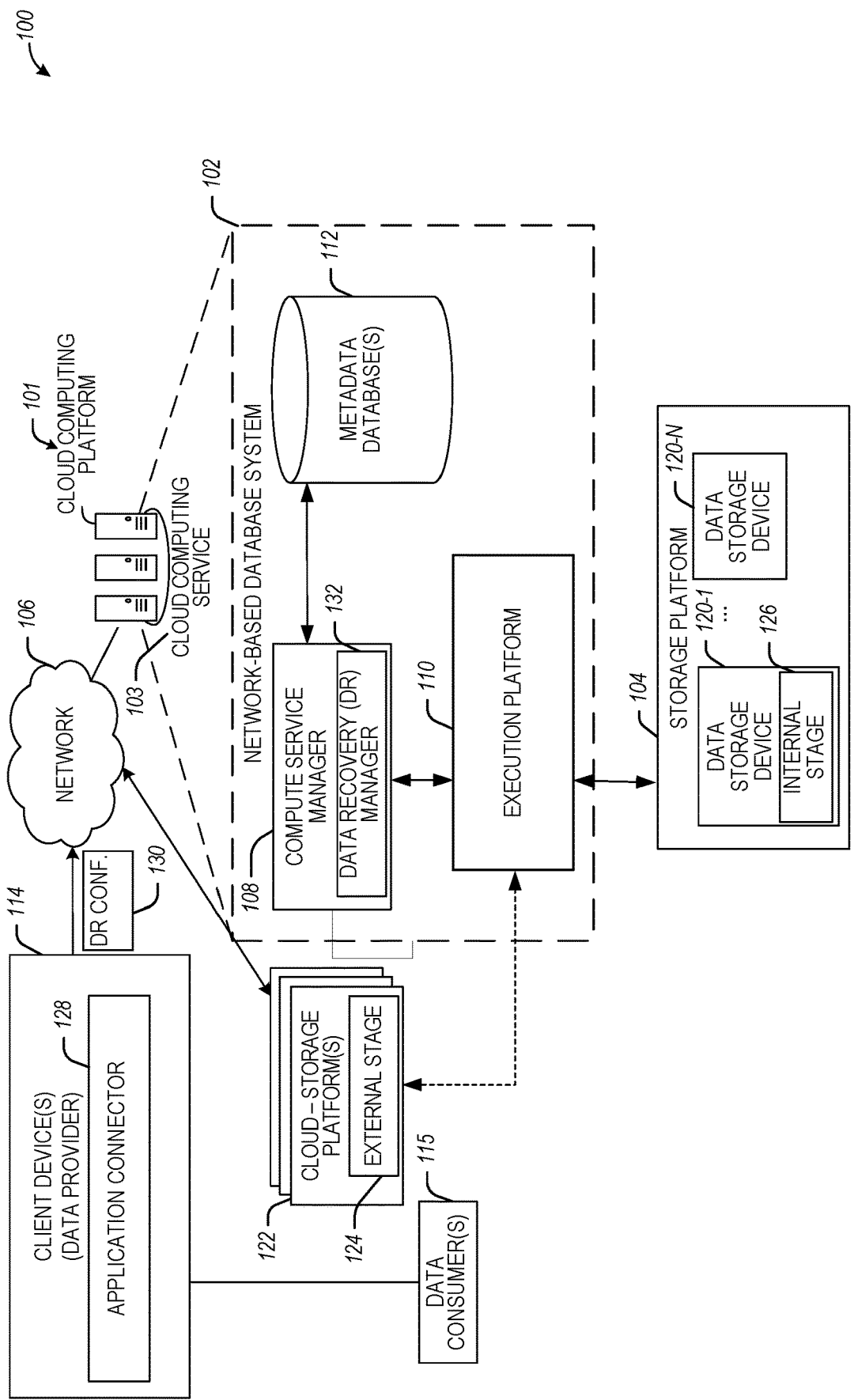
FIG. 1 illustrates an example computing environment that includes a network-based database system in communication with a cloud storage platform, according to some example embodiments.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, extensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

In a typical implementation, a data platform may include one or more databases that are respectively maintained in association with any number of customer accounts (e.g., accounts of one or more data providers), as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata (e.g., account object metadata) in association with the data platform in general and in association with, for example, particular databases and/or particular customer accounts as well. Users and/or executing processes that are associated with a given customer account may, via one or more types of clients, be able to cause data to be ingested into the database, and may also be able to manipulate the data, add additional data, remove data, run queries against the data, generate views of the data, and so forth. As used herein, the terms "account object metadata" and "account object" are used interchangeably.

In an implementation of a data platform, a given database (e.g., a database maintained for a customer account) may reside as an object within, e.g., a customer account, which may also include one or more other objects (e.g., users, roles, grants, shares, warehouses, resource monitors, integrations, network policies, and/or the like). Furthermore, a given object such as a database may itself contain one or more objects such as schemas, tables, materialized views, and/or the like. A given table may be organized as a collection of records (e.g., rows) so that each includes a plurality of attributes (e.g., columns). In some implementations, database data is physically stored across multiple storage units, which may be referred to as files, blocks, partitions, micro-partitions, and/or by one or more other names. In many cases, a database on a data platform serves as a backend for one or more applications that are executing on one or more application servers.

The disclosed data recovery (DR) techniques can be configured and performed by a DR manager in a network-based database system to automate data recovery including recovery of historical table data.

Conventional techniques for recovery of historical table data in the event of system failures or user mistakes (or other data availability issues associated with extreme operational disasters) include a multi-step process that is resource-intensive, slow, and inefficient. For example, existing techniques include copying data from a source table's files and using a custom script to create a new table. If the recovery includes a large amount of data, then data recovery can take a very long time as copying the data is time-consuming. Additionally, this conventional data recovery process has multiple manual steps which need to be handled by support engineers to run, rendering the process error-prone and difficult to sustain during a large-scale recovery. For example, if a source table is dropped and expired, recreating the table schema can be a painstaking manual process.

The disclosed DR techniques can be performed by a DR manager (e.g., as described herein) and can be used to configure the failsafe recovery process more efficiently, resulting in an efficient DR experience. More specifically, the disclosed DR techniques associates recovered data files of a table (e.g., partition files of a table) with a newly recovered table (e.g., a table having the same schema as a deleted table), without the need to copy the data from the recovered data files. Since the disclosed DR techniques include fewer manual steps than conventional DR techniques, DR using the disclosed techniques is error-proof and efficient. Additionally, since the disclosed techniques are associated with reduced involvement of database support engineers, failsafe recovery can be automated to address any increased recovery demands in a network-based database system.

Figure 3:
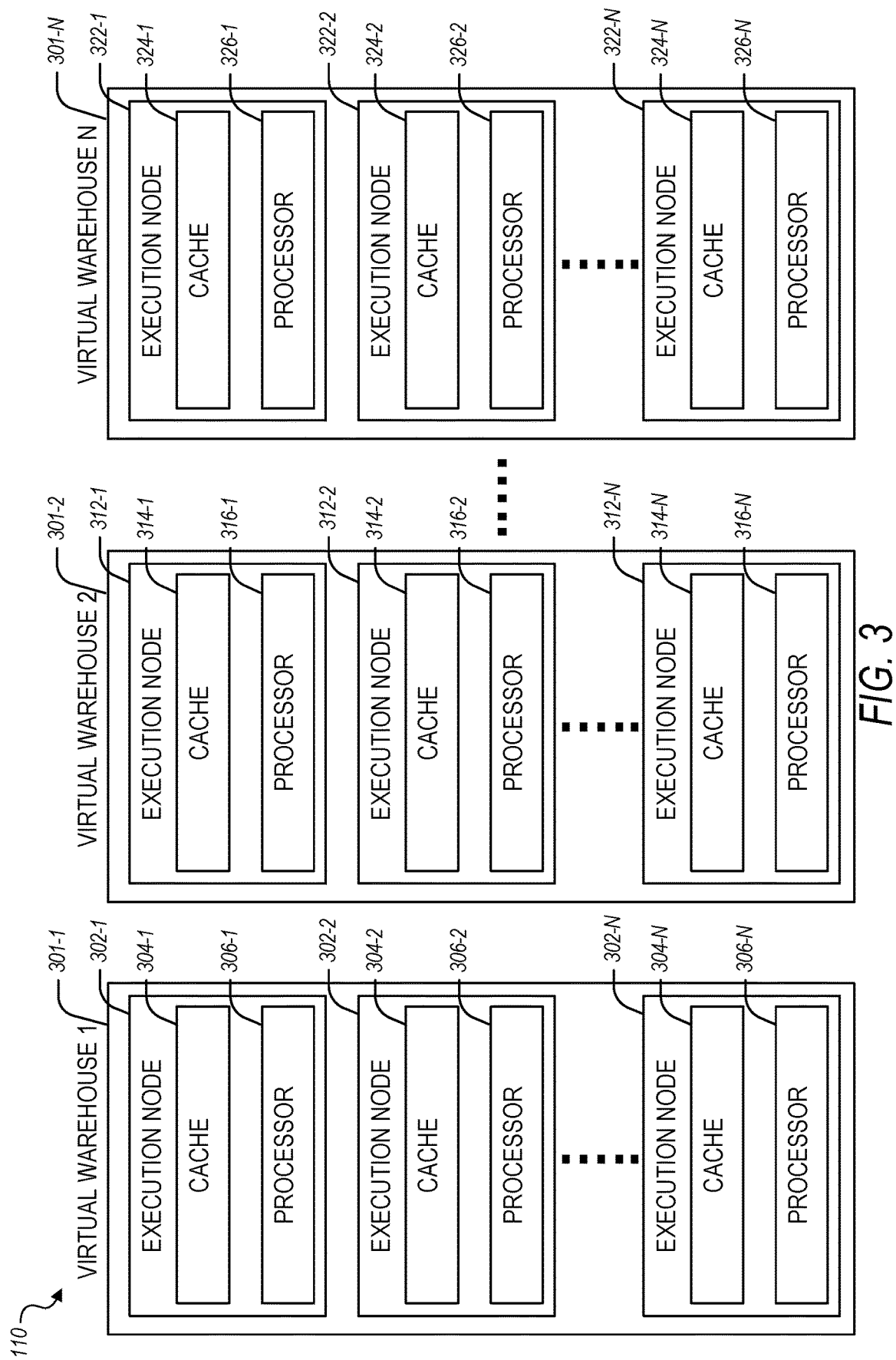
FIG. 3 is a diagram illustrating components of an execution platform, according to some example embodiments.
Figure 4:
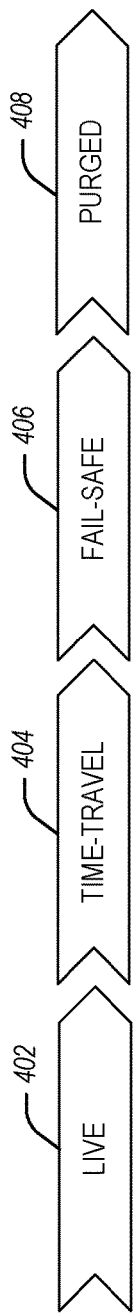
FIG. 4 is a diagram illustrating the lifecycle of a table, according to some example embodiments.
Figure 5:
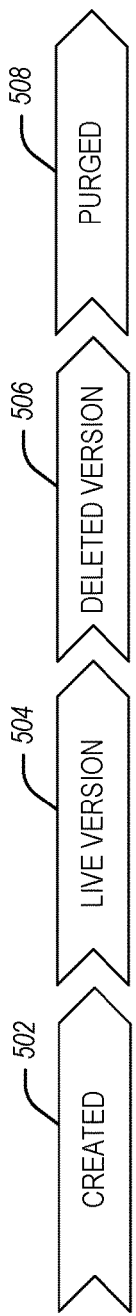
FIG. 5 is a diagram illustrating the lifecycle of a partition data file associated with a table, according to some example embodiments.
Figure 6:
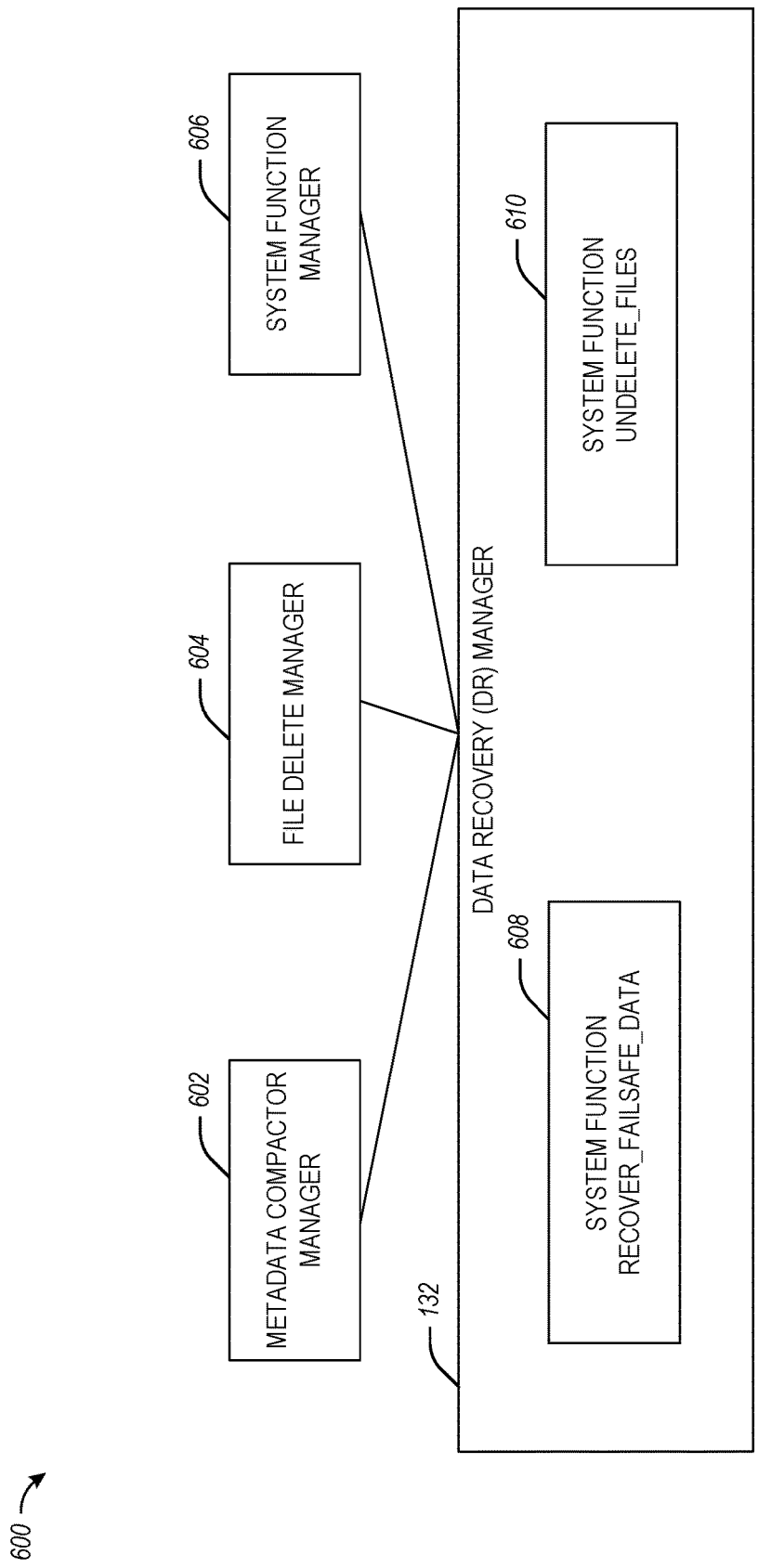
FIG. 6 is a diagram of a data recovery manager used in the network-based database system of FIG. 1, according to some example embodiments.

The various embodiments that are described herein are described with reference where appropriate to one or more of the various figures. An example computing environment including a DR manager configured to perform DR-related functions is discussed in connection with FIGS. 1-3. Example lifecycles of data are illustrated in FIG. 4 and FIG. 5. An example DR manager in communication with a metadata compactor manager and a file delete manager is illustrated in FIG. 6. Example DR-related functionalities performed using the disclosed techniques are discussed in connection with FIGS. 7-12. A more detailed discussion of example computing devices that may be used with the disclosed techniques is provided in connection with FIG. 13.

FIG. 1 illustrates an example computing environment 100 that includes a database system in the example form of a network-based database system 102, according to some example embodiments. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g. SQL queries, analysis), as well as other processing capabilities (e.g., configuring replication group objects as described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types-on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage). The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108. Client device 114 (also referred to as remote computing device or user device 114) may include one or more of a laptop computer, a desktop computer, a mobile phone (e.g., a smartphone), a tablet computer, a cloud-hosted computer, cloud-hosted serverless processes, or other computing processes or devices may be used (e.g., by a data provider) to access services provided by the cloud computing platform 101 (e.g., cloud computing service 103) by way of a network 106, such as the Internet or a private network. A data consumer 115 can use another computing device to access the data of the data provider (e.g., data obtained via the client device 114).

In the description below, actions are ascribed to users, particularly consumers and providers. Such actions shall be understood to be performed concerning client device (or devices) 114 operated by such users. For example, a notification to a user may be understood to be a notification transmitted to the client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some embodiments, the client device 114 is configured with an application connector 128, which may be configured to perform DR configuration functions (e.g., select a time-travel duration for a period during which deleted data can be recovered). In some aspects, the DR configuration functions are used to generate one or more DR configurations 130 for communication to the network-based database system 102 via network 106. For example, DR configurations 130 can be communicated to DR manager 132 within the compute service manager 108.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device. In some embodiments, metadata database 112 is configured to store account object metadata (e.g., account objects used in connection with a replication group object).

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, the compute service manager 108 includes the DR manager 132. The DR manager 132 comprises suitable circuitry, interfaces, logic, and/or code and is configured to perform DR-related functions which can be based (at least partially) on one or more of the DR configurations 130. For example, the DR manager 132 can configure one or more of the DR functionalities discussed in connection with FIGS. 4-12 based on the DR configurations 130 or other configurations related to data recovery within the network-based database system 102.

In some aspects, the DR manager 132 can include one or more system functions that can be used to check the source table's information and determine if it should be recovered by failsafe recovery (e.g., using the disclosed techniques). The different types of data recovery which may be available in the network-based database system 102 (e.g., time-travel and failsafe recovery) are discussed in connection with FIGS. 4-5. If failsafe recovery is available (e.g., to an account of a customer of the network-based database system), the DR manager 132 will undelete the partition files associated with the source table from internal storage (e.g., AWS S3 storage) (e.g., internal stages of storage platform 104), if such partition files are deleted in storage. After the partition files are made available, the DR manager 132 can create a new table based on the source table's metadata information. The partition files can then be associated with the new table (e.g., similar to a cloning process). Since such a cloning process is only a metadata operation without copying a significant amount of data, the DR-related functions performed by the DR manager 132 are more efficient in comparison to conventional DR techniques which involve copying a significant amount of data.

In some embodiments, during a DR process, the compute service manager 108 can use the disclosed DR functionalities to check if the files are still available or not in the storage platform 104, and recover the files if they are marked as "deleted." After that, the execution platform 110 can scan those files in the storage platform 104.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During a typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
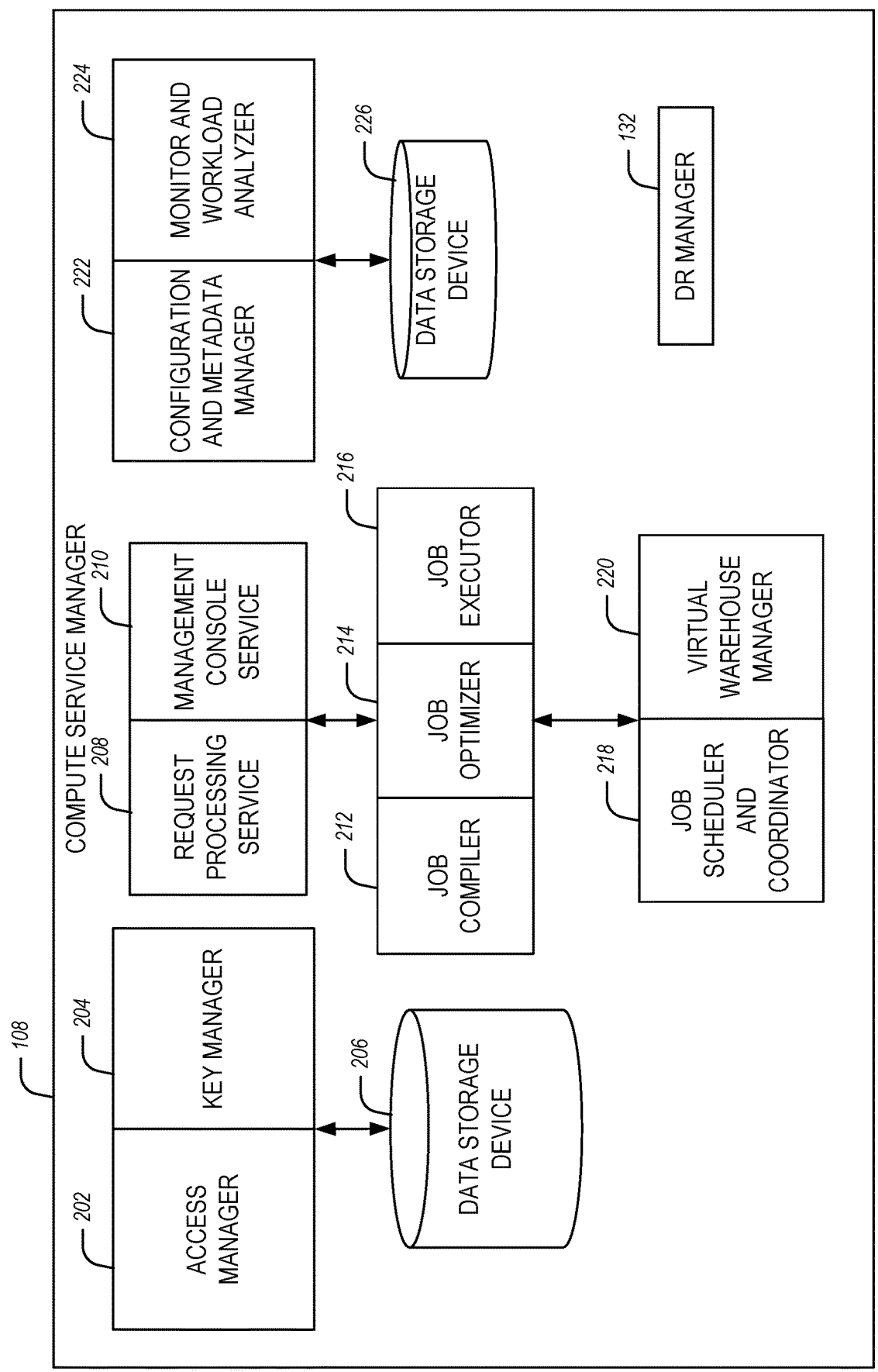
FIG. 2 is a diagram illustrating the components of a compute service manager, according to some example embodiments.

FIG. 2 is a block diagram illustrating components of the compute service manager 108, according to some example embodiments. As shown in FIG. 2, the compute service manager 108 includes an access manager 202 and a key manager 204 coupled to an access metadata database 206, which is an example of the metadata database(s) 112. Access manager 202 handles authentication and authorization tasks for the systems described herein. The key manager 204 facilitates the use of remotely stored credentials to access external resources such as data resources in a remote storage device. As used herein, the remote storage devices may also be referred to as "persistent storage devices" or "shared storage devices." For example, the key manager 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the key manager 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes configuration and metadata manager 222, which manages the information related to the data stored in the remote data storage devices and the local buffers (e.g., the buffers in execution platform 110). Configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

As previously mentioned, the compute service manager 108 includes the DR manager 132 configured to perform the disclosed DR functionalities which are discussed in connection with at least FIGS. 4-12.

FIG. 3 is a block diagram illustrating components of the execution platform 110, according to some example embodiments. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues and network overhead). In some example embodiments, the imbalances are addressed at the scan level using a file-stealing scheme. In particular, whenever a node process completes scanning its set of input files, it requests additional files from other nodes. If one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud storage platform 104 (e.g., from data storage device 120-1), and does not download the files from the transferring node. In this way, lagging nodes can transfer files via file stealing in a way that does not worsen the load on the lagging nodes.

Although virtual warehouses 1, 2, and N are associated with the same execution platform 110, virtual warehouses 1, . . . , N may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

In some aspects, table data can be divided into one or more micro-partitions, which are contiguous units of storage. As used herein, the terms "partition files" (or "partition data files") and micro-partitions are interchangeable. In this regard, source table data can be stored as multiple partition files associated with the source table.

FIG. 4 is diagram 400 illustrating the lifecycle of a table, according to some example embodiments. Referring to FIG. 4, a source table is available to a customer account during the live stage period 402. In some aspects, the network-based database system 102 provides customers with features to ensure the availability of their data. Specifically, during the time travel period 404, customer accounts can restore a historical version of the source table for up to a first threshold period (e.g., 90 days from deletion) which can be configured by the customer account.

During the failsafe period 406, the customer account can request the network-based database system 102 to recover the source table after the time travel period 404 for up to an additional second threshold period (e.g., 7 days, or another fixed threshold, after the time travel period ends and which fixed threshold may not be changed by the customer account). After the failsafe period 406, the source table is purged during the purge period 408 and data recovery is no longer possible.

FIG. 5 is a diagram 500 illustrating the lifecycle of a partition data file associated with a table, according to some example embodiments. Referring to FIG. 5, lifecycle stages 502-508 of a partition data file correspond to the lifecycle stages 402-408 of a source table. The partition data file is created during a creation period 502. The partition data file of the source table is available to a customer account during the creation period 402. During the time travel period 404, a live version 504 of the partition table is available, and the customer accounts can use the live version of the table for up to a first threshold period (e.g., 90 days from deletion) which can be configured by the customer account.

During the failsafe period 406, the partition data file is deleted and can be referred to as a deleted version 506. In some aspects, a partition data file is not purged during the failsafe period 406. Instead, the partition data file (or each of multiple partition data files associated with a source table) can include a deleted file designation. For example, such a deleted file designation can be the partition file version number (e.g., the live version designation can be ver. 1 and the deleted file designation can be ver. 2).

During the purge period 408, the partition data file is purged and can be referred to as a purged version 508.

In some aspects, source table data can be considered as successfully committed once the partition file is created and a corresponding metadata file associated with the current version of the table has a reference to the version of the partition file that was created.

FIG. 6 is a diagram 600 of the data recovery manager 132 in communication with a metadata compactor manager and a file delete manager which can be used in the network-based database system of FIG. 1, according to some example embodiments. Referring to FIG. 6, DR manager 132 is in communication with the metadata compactor manager 602, the file delete manager 604, and the system function manager 606.

The metadata compactor manager 602 (which can also be referred to as a file compactor, metadata compactor, or file compactor manager) comprises suitable circuitry, logic, interfaces, and/or code and is configured to monitor the lifecycle of partition files associated with one or more source tables and determine which files have to be deleted. The file delete manager 604 comprises suitable circuitry, logic, interfaces, and/or code and is configured to delete the partition files that the metadata compactor manager 602 has determined to be deleted. In some aspects, the file delete manager 604 can add a deleted file designation to a partition file (e.g., increase the version number of the file or use a different designation) to indicate the file as a deleted file (without purging the file). In this regard, a deleted file (which is not purged) can be recovered (or undeleted) when the deleted file designation is removed.

The system function manager 606 comprises suitable circuitry, logic, interfaces, and/or code and can configure one or more system functions used by the DR manager 132 in connection with DR-related functionalities. For example, the system function manager 606 can configure system function 608 of the DR manager 132 for recovering failsafe data (also referred to as recover_failsafe_data function) and system function 610 for undeleting files (also referred to as undelete_files system function). The use of system functions 608 and 610 in connection with DR-related functions is discussed further below in connection with FIGS. 8-11.

In some aspects, during the time travel period 404, a metadata layer associated with a metadata file remembers what subset of the metadata files to associate with a specific version of the source table that is relevant at a given point in time. When time crosses the associated time travel retention on the table, the metadata compactor manager 602 identifies what files can be safely moved into the failsafe period. In some aspects, the names of these partition files can be grouped into a metadata file of the table or persisted into a database. In some aspects, the list of the partition files is polled periodically by the file delete manager 604 and can be subsequently moved into the failsafe window by creating a new version of the file that has a delete marker (e.g., a deleted file designation) on it.

Even though FIG. 6 illustrates the DR manager 132 being in communication with, and separate from, the metadata compactor manager 602, the file delete manager 604, and the system function manager 606, the disclosure is not limited in this regard. In some embodiments, the DR manager 132 can incorporate one or more of the functionalities performed by the metadata compactor manager 602, the file delete manager 604, and the system function manager 606.

Figure 7:
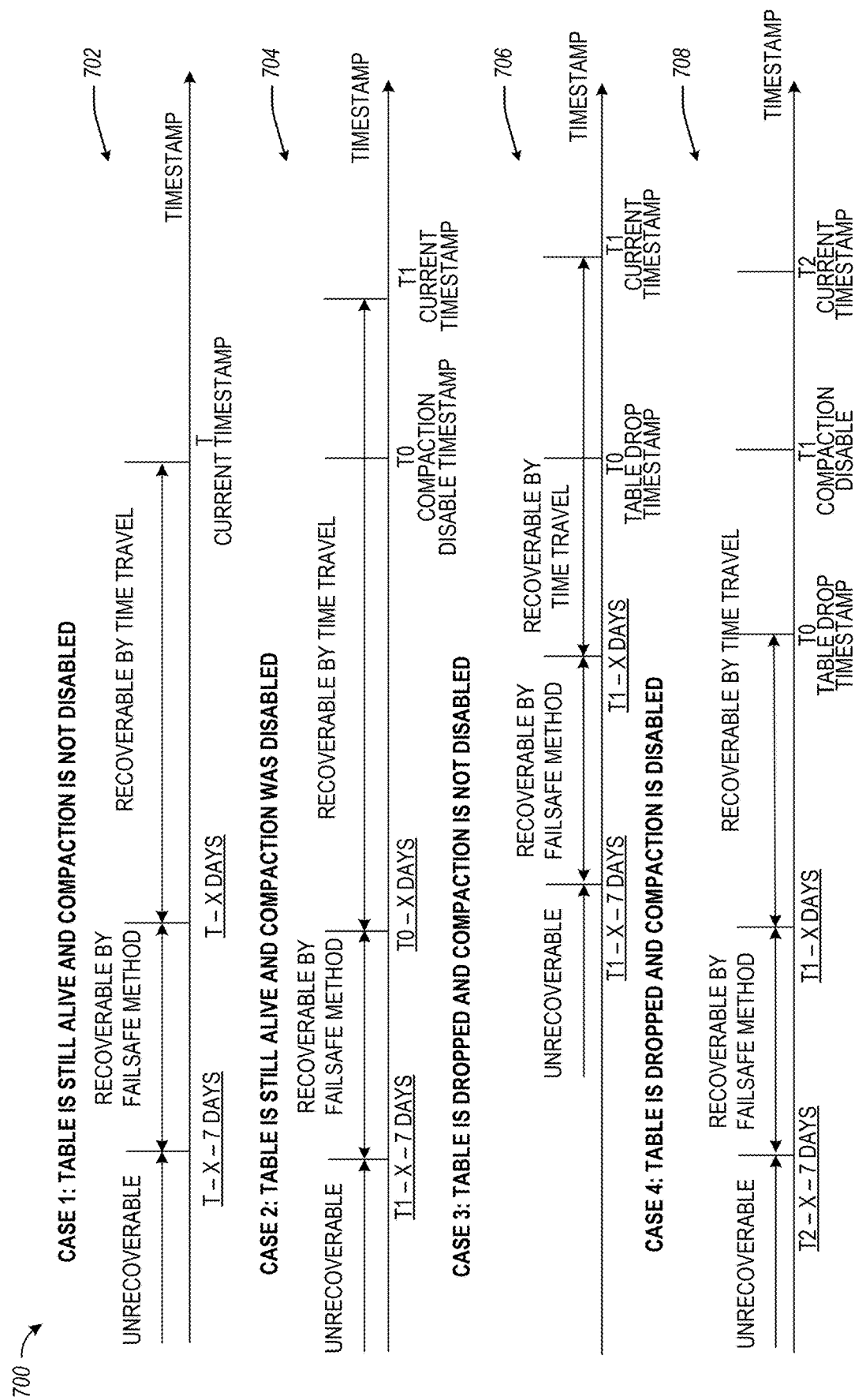
FIG. 7 is a diagram illustrating different data recoverability cases associated with different table lifecycle stages, according to some example embodiments.

FIG. 7 is a diagram 700 illustrating different data recoverability cases associated with different table lifecycle stages, according to some example embodiments.

Diagram 702 illustrates a first recoverability case when the table is still alive, compaction by the metadata compactor manager 602 is not disabled, and the current timestamp is t. For the timestamps within the time travel range (e.g., [t−X days, t]), customers can recover their data by using a time travel SQL command directly (e.g., SQL command "SELECT/CLONE . . . AT|BEFORE . . . ").

For the timestamps within the failsafe time range (e.g., [t–X–7 days, t–X day]), data can be recovered using the disclosed techniques.

For the timestamps beyond the failsafe period (e.g., [ . . . , t–X–7 day]), data may not be recovered, and there can be no guarantee of recovery even if some data may not be purged yet.

Diagram 704 illustrates a second recoverability case when the table is still alive, compaction by the metadata compactor manager 602 was stopped at time t0, and the current timestamp is t1. For the timestamps within the time travel range (e.g., [t0–X days, t1]), data can be recovered by using the time travel SQL command directly (e.g., SQL command "SELECT/CLONE . . . AT|BEFORE . . . ").

For the timestamps within the failsafe time range (e.g., [t1–X–7 days, t0–X days]), data can be recovered using the disclosed techniques. This time window will shrink with time going forward, as t1 is the current timestamp, and eventually, the recoverable window will disappear.

For the timestamps beyond the failsafe period (e.g., [ . . . , t1–X–7 days]), data may not be recovered, and there can be no guarantee of recovery even if some data may not be purged yet.

Diagram 706 illustrates a third recoverability case when the table is dropped at time t0, the current timestamp is t1, and compaction by the metadata compactor manager 602 was not stopped. For the timestamps within the time travel range (e.g., [t1–X days, t0]), data can be recovered by using the "UNDROP . . . " SQL command (e.g., the command can be used to recover the table at time t0). Then a time travel SQL command "SELECT/CLONE . . . AT|BEFORE . . . " can be executed to recover the data at a particular timestamp within the time travel range [t1–X days, t0].

For the timestamps within the failsafe time range (e.g., [t1–X–7 days, t1–X days]), data can be recovered using the disclosed techniques. However, if there was any schema change in the table, it may not work and the changes on the schema may need to be confirmed with the customer account. This time window can shrink with time going forward, as t1 is the current timestamp, and eventually, the recoverable window will disappear.

For the timestamps beyond the failsafe period (e.g., [ . . . , t1–X–7 days]), data may not be recovered, and there can be no guarantee of recovery even if some data may not be purged yet.

Diagram 708 illustrates a fourth recoverability case when the table is dropped at time t0, compaction by the metadata compactor manager 602 was stopped at time t1, and the current timestamp is t2. For the timestamps within the time travel range (e.g., [t1–X days, t0]), data can be recovered by using the "UNDROP . . . " SQL command (e.g., the SQL command can be used to recover the table at time t0). The customer can then run the time travel SQL command "SELECT/CLONE . . . AT|BEFORE . . . " to recover the data at a particular timestamp within the time travel range [t1–X days, t0].

For the timestamps within the failsafe time range (e.g., [t2–X–7 days, t1–X days]), data can be recovered using the disclosed techniques. However, if there was any schema change in the table, it may not work, and the changes on the schema may need to be confirmed with the customer account.

For the timestamps beyond the failsafe period (e.g., [ . . . , t2–X–7 day]), data may not be recovered and there can be no guarantee of recovery even if some data may not be purged yet.

In some embodiments, the following configurations for a partition file lifecycle implementation can be used for different cloud providers:

(a) Amazon AWS®

Versioning of data on AWS® S3 storage can be enabled and a life-cycle policy is associated with the data. In this regard, when a delete API is issued to an object, S3 can create an "empty" version or tombstone for this data. Attempts to retrieve this data can result in an error. The lifecycle policy of table partition files indicates that once the data is tombstoned, it can be purged from S3 any time after 7 days. To undelete this data, one has to explicitly delete the latest version of the object.

(b) Microsoft Azure®

Blob storage in Azure® provides similar soft-delete functionality for objects with the ability to specify a similar life-cycle policy. Azure® may not transparently expose how it implements the soft delete (like S3 does via versioning). However, it offers an undelete( ) API to recover such deleted objects.

(c) Google Cloud Platform (GCP)

While versioning is not leveraged, GCP has a concept of an "Event-Based Hold". Objects that have an Event-Based Hold are not subject to life cycle policies. To emulate the behavior described in the other cloud provider sections, when an object is created an event-based hold is immediately added to it. When the object is deleted, the hold is removed and the object is made subject to the life-cycle policy which allows the cloud store to purge this object after 7 days. Thus to undelete such an object, the Event-Based Hold can be added back.

Figure 8:
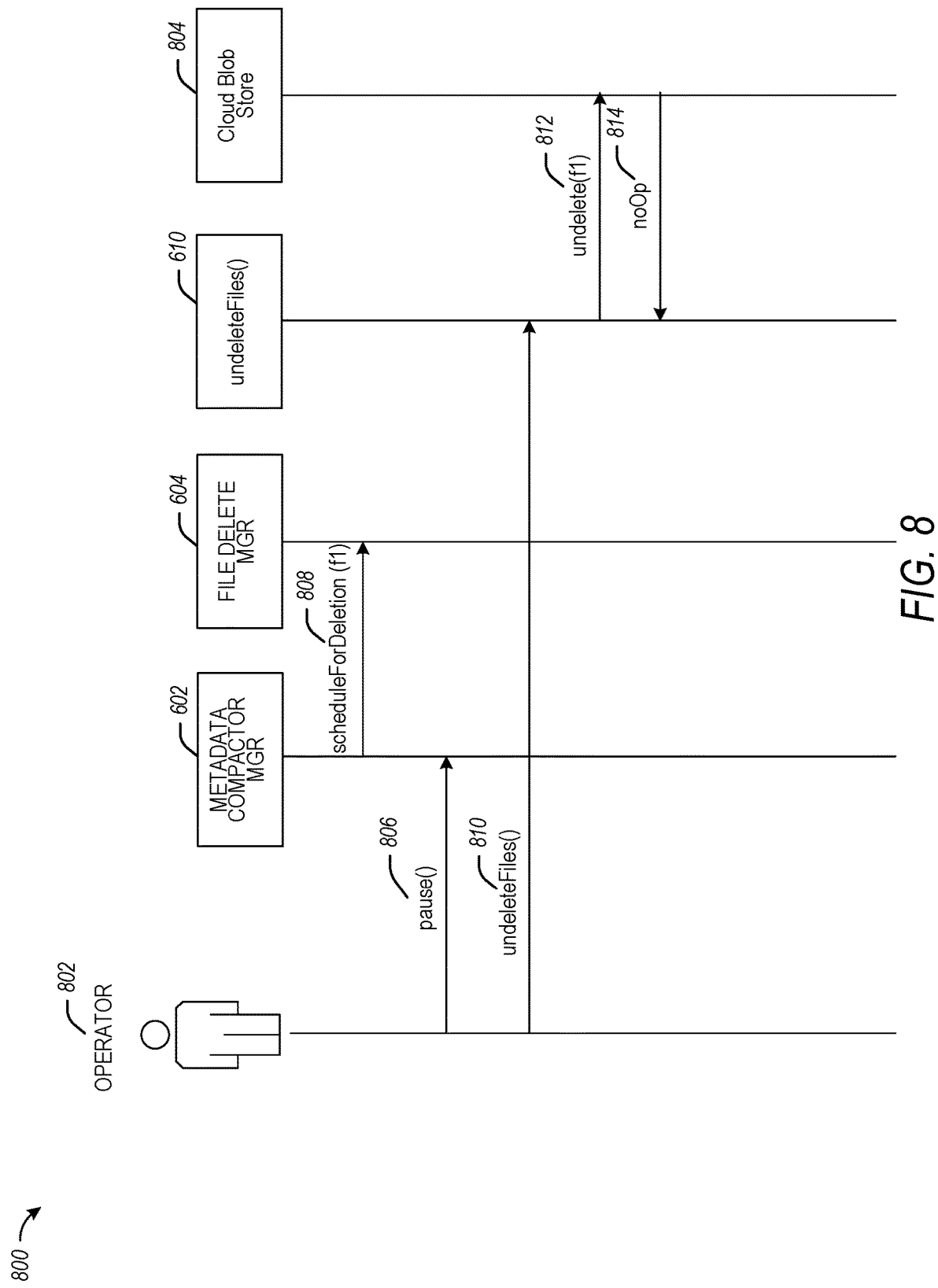
FIG. 8 is a diagram illustrating example functionalities of the components of the data recovery manager of FIG. 6, according to some example embodiments.

FIG. 8 is diagram 800 illustrating example functionalities of the components of the data recovery manager of FIG. 6, according to some example embodiments. Referring to FIG. 8, diagram 800 illustrates example file deletion functionalities performed by the DR manager 132 and/or other components disclosed herein (e.g., the metadata compactor manager 602, the file delete manager 604, and the undelete_files system function 610).

As described above, the file delete manager 604 is a component that is responsible for deleting partition files after they are no longer referenced by table metadata. In some aspects, different components convey to the file delete manager 604 explicitly what files need to be deleted via either a deletion list or grouping the files into a metadata file or a file deletion slice (e.g., (FILE_DELETION_SLICE). The file delete manager 604 can scan through this list of files and issues batch delete calls which soft-delete objects in AWS/Azure/GCP.

For a regular table, the component that gives the file delete manager 604 what files to delete is the metadata compactor manager 602. Even if the metadata compactor manager 602 is stopped, the use of a push model could result in a race condition where the file delete manager 604 un-does the work that is done by the undelete_files system function 610.

FIG. 8 summarizes this scenario. More specifically, the metadata compactor manager 602 communicates file candidates for deletion to the file delete manager 604 at operation 808. An operator 802 can issue a pause command 806 to pause metadata compaction. An undelete command 810 is then issued, which executes the undelete_files system function 610. A subsequent undelete command 812 is communicated to the cloud provider blob store 804, which returns an acknowledgment 814.

In some aspects, removing the file names from the deletion list may not be sufficient because the files can also be in deletion metadata files. Since file delete manager 604 works on a per-account basis, pausing it for an indefinite amount of time could have a potentially significant impact on operating costs.

In some aspects, the DR manager 132 can generate a notification to the customer account communicating the data recovery request that a restore operation was successful or is guaranteed to be successful.

Figure 9:
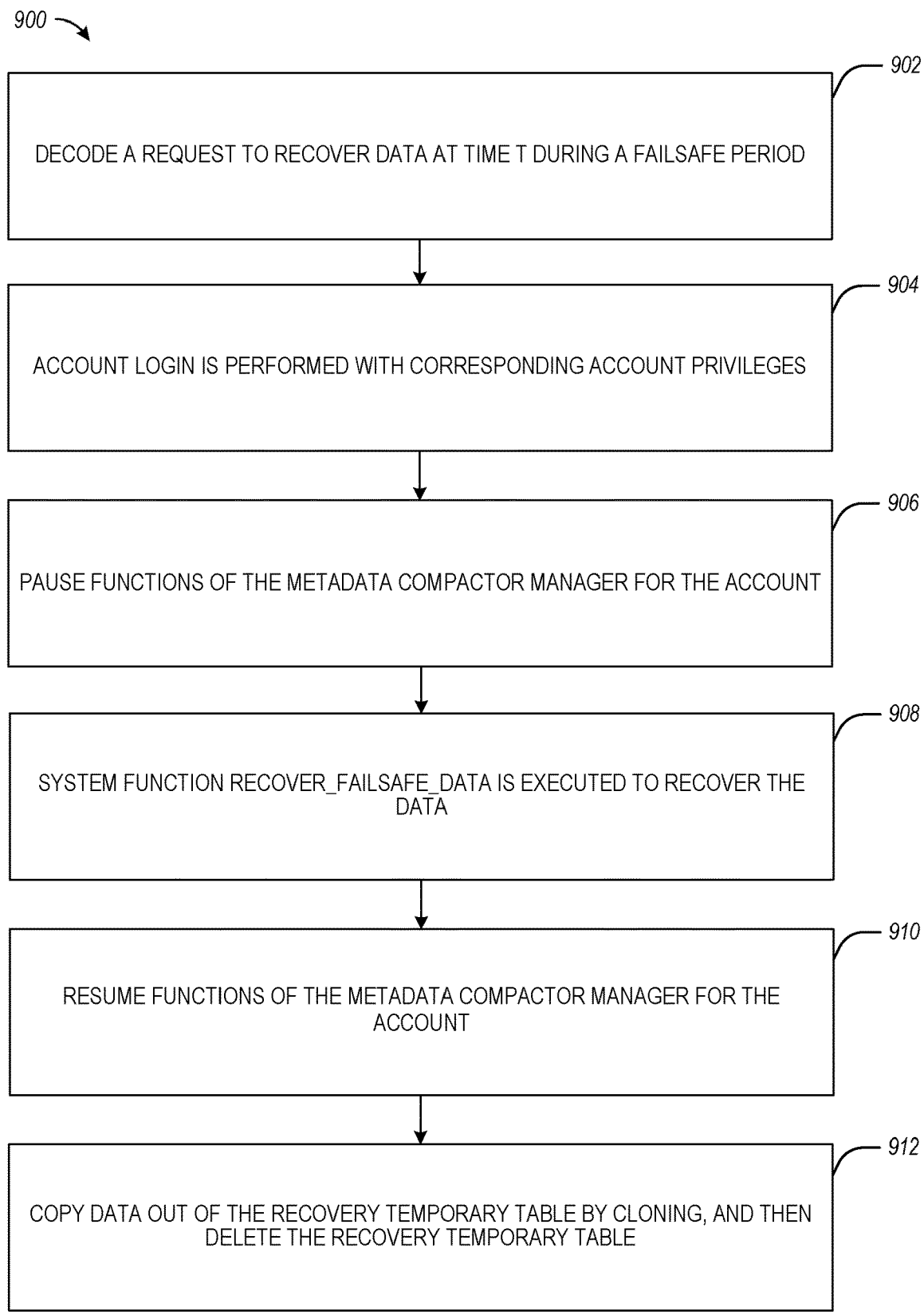
FIG. 9 is a flowchart of a method for data recovery, according to some example embodiments.

FIG. 9 is a flowchart of method 900 for data recovery, according to some example embodiments. Method 900 may be embodied in computer-readable instructions for execution by one or more hardware components (e.g., one or more processors) such that the operations of method 900 may be performed by components of the network-based database system 102, such as a network node (e.g., a DR manager 132 executing on a network node of the compute service manager 108) or a computing device (e.g., client device 114), one or both of which may be implemented as machine 1300 of FIG. 13 performing the disclosed functions. Accordingly, method 900 is described below, by way of example with reference thereto. However, it shall be appreciated that method 900 may be deployed on various other hardware configurations and is not intended to be limited to deployment within the network-based database system 102.

At a high level, method 900 can be based on the following functions: (a) retrieve the last known schema of the table for which data recovery is requested; (b) retrieve the list of the partition files for the version of the table corresponding to a historical timestamp; (c) recover the partition files by preventing them from being purged by cloud providers (e.g., this functionality can include deleting the "deleted version" of the file in S3 by removing the deleted file designation); and (d) create metadata corresponding to the recovered schema and partition files (e.g., also referred to as a clone-style recovery).

The following sequence of operations illustrated in FIG. 9 summarizes the data recovery process that is aided by system functions 608 and 610 (e.g., also referred to as system$recover_failsafe_data and system$undelete_files).

At operation 902, a request to recover data (e.g., a request to recover a source table) is received and decoded. The request can be associated with recovering the source table data at time t during a failsafe period.

At operation 904, an account login is performed with corresponding account privileges. For example, a user of the customer account logs in with the necessary account privileges.

At operation 906, the functions of the metadata compactor manager are paused for the particular customer account.

At operation 908, the system function system$recover_failsafe_data (e.g., system function 608) is executed to recover the data. In some aspects, the recovered data is written into a temporary recovery table in the customer account (e.g., for security reasons). In some aspects, the temporary recovery table can be referred to as "_recovery-db._recoveryschema._recovery{table_name}" inside the customer account. If such a table already exists, then a timestamp suffix is added. In some aspects, a temporary/permanent table location can be specified to recover a table directly.

At operation 910, the functionalities of the metadata compactor manager can be resumed for the particular customer account.

At operation 912, the data is copied out of the recovery temporary table by cloning (e.g., based on performing a metadata operation associating the recovered partition files with the table), and then deletes the recovery temporary table.

Figure 10:
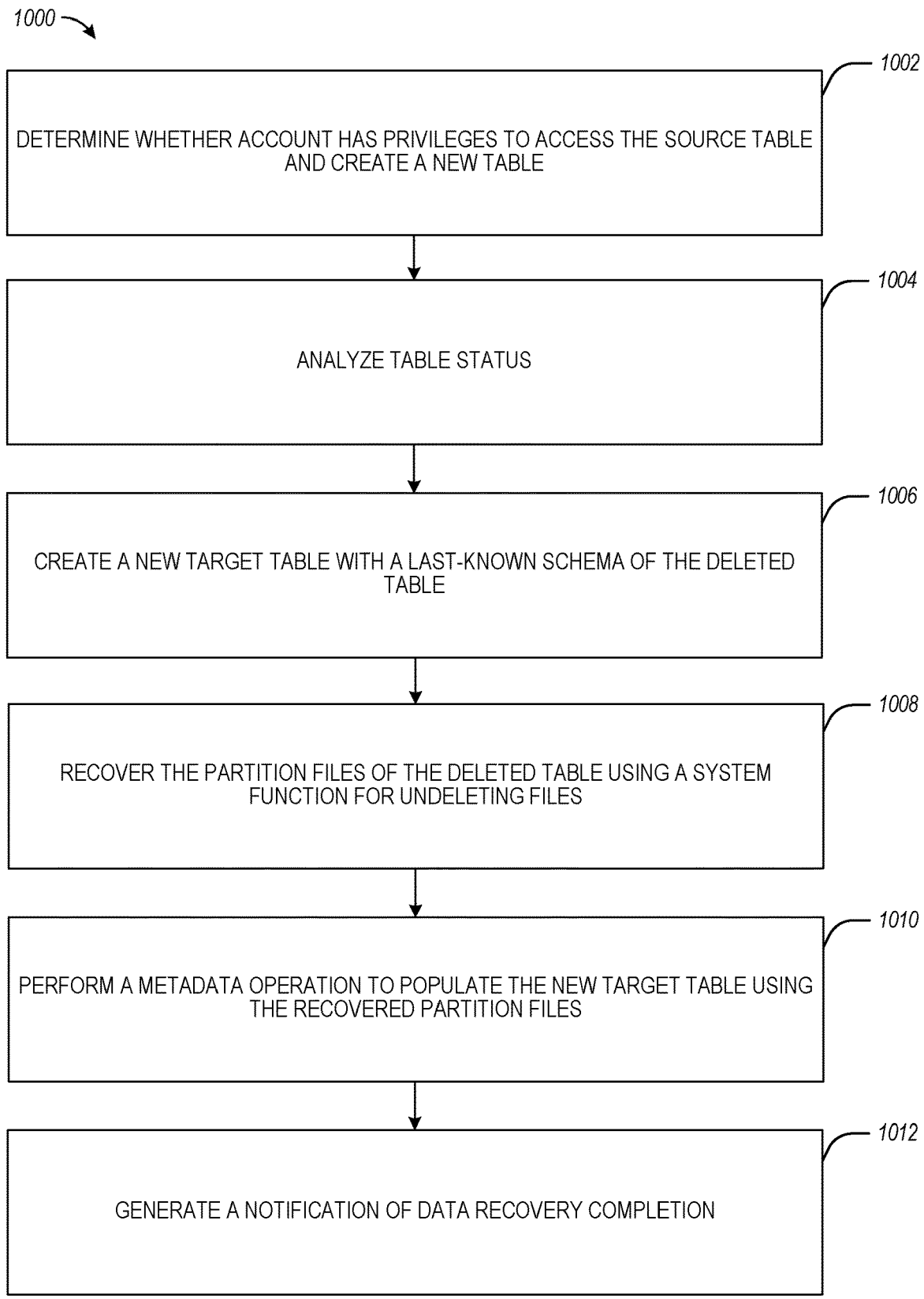
FIG. 10 is a flowchart of a method for recovering failsafe data which can be used by the method of FIG. 9, according to some example embodiments.

FIG. 10 is a flowchart of method 1000 for recovering failsafe data which can be used by the method of FIG. 9, according to some example embodiments. Method 1000 may be embodied in computer-readable instructions for execution by one or more hardware components (e.g., one or more processors) such that the operations of method 1000 may be performed by components of the network-based database system 102, such as a network node (e.g., a DR manager 132 executing on a network node of the compute service manager 108) or a computing device (e.g., client device 114), one or both of which may be implemented as machine 1300 of FIG. 13 performing the disclosed functions. Accordingly, method 1000 is described below, by way of example with reference thereto. However, it shall be appreciated that method 1000 may be deployed on various other hardware configurations and is not intended to be limited to deployment within the network-based database system 102.

At operation 1002, a determination is made on whether the account (e.g., the consumer account communicating the request for data recovery of a source table) has privileges to access the source table and create a new table.

At operation 1004, the table status is analyzed based on the table lifecycle information (e.g., using the lifecycle information of FIG. 4 and FIG. 5). For example, if the timestamp at the table can be recovered by time travel, a notification is returned so that time travel SQL commands can be executed. If the timestamp at the table passed the recoverable bound, then an error message is returned in response to the data recovery request. If the timestamp is still in the failsafe recoverable time range, then the subsequent operations can be executed.

At operation 1006, a new target table is created (e.g., table "targetTableName") with a recovered table schema. This can be the last known schema for the source table.

At operation 1008, the partition files of the deleted table that belong to the specified timestamp are recovered using the undelete_files system function (e.g., system function 610).

At operation 1010, a metadata operation is performed to populate the new target table with the recovered partition files.

At operation 1012, a notification of the data recovery completion is generated and sent back in response to the data recovery request. If failure is detected during the data recovery, the target table is deleted. Otherwise, a notification is returned to the account sending the DR request (e.g., a notification "recovery to a table xxx is complete from table yyy at time t" is communicated back to the consumer account sending the DR request).

Figure 11:
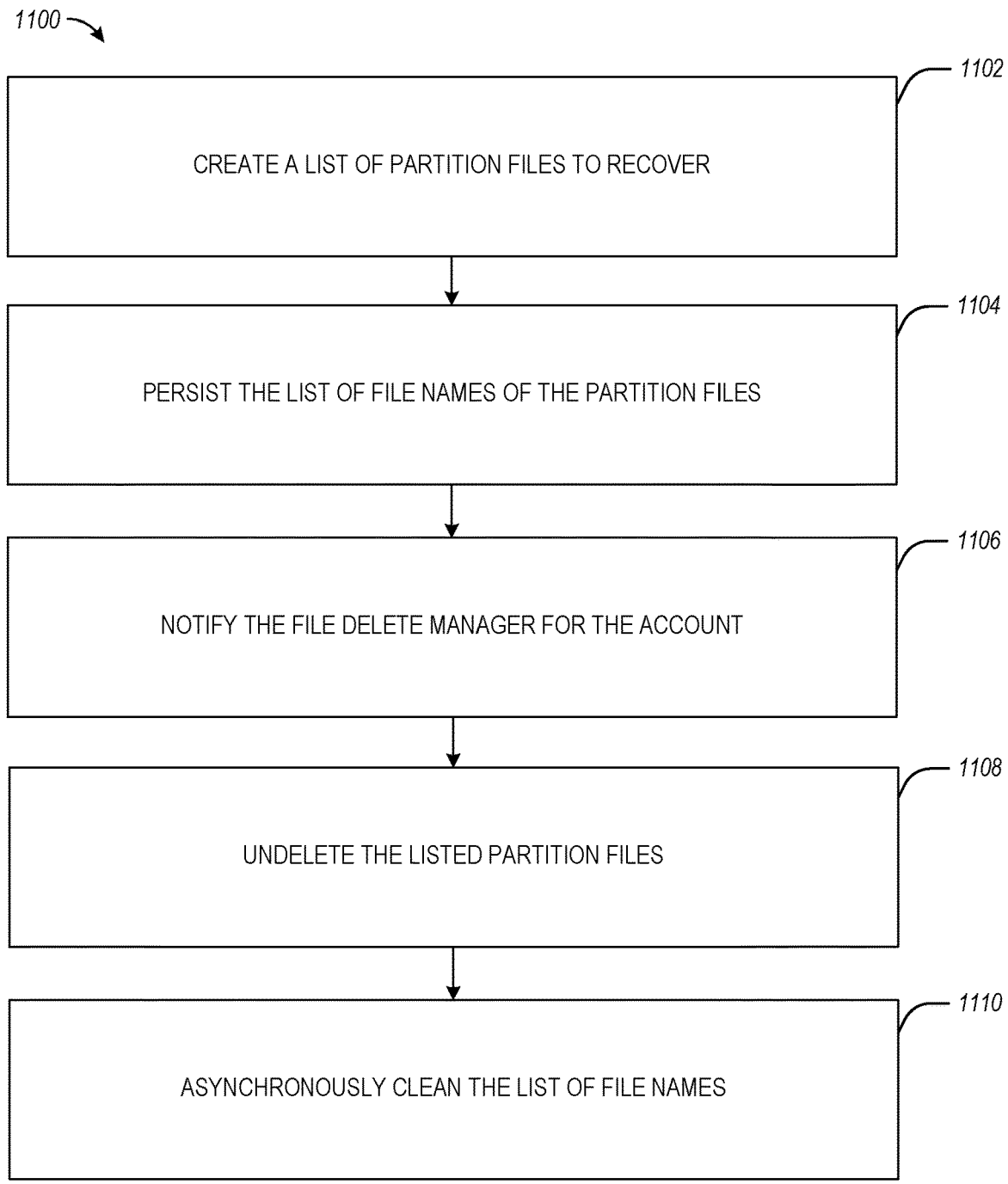
FIG. 11 is a flowchart of a method for undeleting files that can be used by the method of FIG. 10, according to some example embodiments.

FIG. 11 is a flowchart of method 1100 for undeleting files which can be used by the method of FIG. 10, according to some example embodiments. Method 1100 may be embodied in computer-readable instructions for execution by one or more hardware components (e.g., one or more processors) such that the operations of method 1100 may be performed by components of the network-based database system 102, such as a network node (e.g., a DR manager 132 executing on a network node of the compute service manager 108) or a computing device (e.g., client device 114), one or both of which may be implemented as machine 1300 of FIG. 13 performing the disclosed functions. Accordingly, method 1100 is described below, by way of example with reference thereto. However, it shall be appreciated that method 1100 may be deployed on various other hardware configurations and is not intended to be limited to deployment within the network-based database system 102.

In some aspects, system function 610 (e.g., the undelete_files system function) can be a building block of system function 608 (e.g., the recover_failsafe_data system function) but can also be used as a standalone function for mitigation of data corruption events. In this regard, customer data can be recovered without having to increase retention. In some aspects, the timestamp of recovery need not be provided and all the data in the failsafe is undeleted for this account and table. In some aspects, this system function will not be exposed, and can only be invoked explicitly. This functionality can be used when there is a catastrophic data availability event.

At operation 1102, a list is created of partition files to recover. In some aspects, an iteration/review is performed of the active metadata files for the table version that is on or before the timestamp specified by the customer. Each of the metadata files is unpacked to retrieve a list of partition files that are referred to by that metadata file. If this list cannot be processed in memory in one iteration, then the function will process the files by loading chunks/subsets of file names in memory for processing.

At operation 1104, the list of file names of the partition files to process is persisted. This is the intent log of the undelete operation and can be performed through metadata files.

At operation 1106, the file delete manager for the account is notified. Before performing any undelete operations, the function notifies the file delete manager of the account. This synchronization takes the shape of a lock that exists on a per-account basis. This lock guarantees that any ongoing execution of file delete operations by the file delete manager for this account knows about the ongoing recovery operation or will acknowledge it when it runs at its scheduled time. If there are candidates in its own "deletion queue" that correspond to the list of files to undelete then it must purge them from its queue, else there is a risk that it will move these files into the failsafe zone after the undelete operation is deemed successful.

At operation 1108, the listed partition files are undeleted. In some aspects, the undelete function proceeds after the file delete manager knows about the recovery operation and what files it needs to ignore for an account. In some aspects, undeleting files refers to preventing them from being deleted. In S3 storage terms this would mean removing the "delete version" of the object (e.g., the deleted file designation). The list of the partition files is then partitioned into smaller chunks each of which can be submitted into a thread pool for undeletion. If all the files are undeleted successfully, then a notification is returned to the caller which can include the list of files that were prevented from being deleted.

At operation 1110, the list of file names is asynchronously cleaned. A file delete manager can be used to clean up the list of files. The file delete manager identifies the artifacts generated by the undelete operation that can be safely deleted and purges them from S3.

Figure 12:
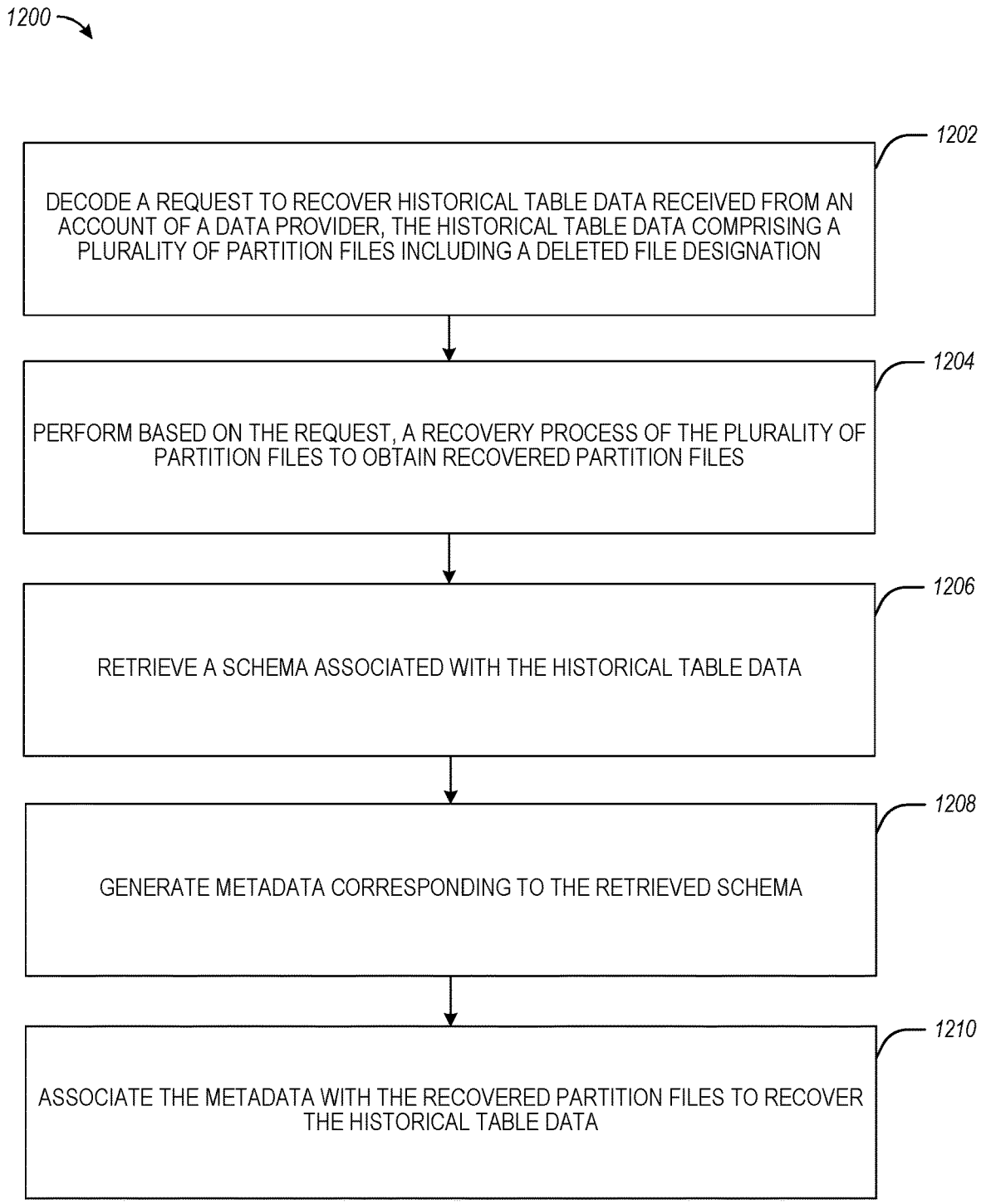
FIG. 12 is a flowchart of another method for data recovery, according to some example embodiments.

FIG. 12 is a flowchart of another method 1200 for data recovery, according to some example embodiments. Method 1200 may be embodied in computer-readable instructions for execution by one or more hardware components (e.g., one or more processors) such that the operations of method 1200 may be performed by components of the network-based database system 102, such as a network node (e.g., a DR manager 132 executing on a network node of the compute service manager 108) or a computing device (e.g., client device 114), one or both of which may be implemented as machine 1300 of FIG. 13 performing the disclosed functions. Accordingly, method 1200 is described below, by way of example with reference thereto. However, it shall be appreciated that method 1200 may be deployed on various other hardware configurations and is not intended to be limited to deployment within the network-based database system 102.

At operation 1202, a request to recover historical table data is decoded. The request can be received from an account of a data provider. The historical table data can include a plurality of partition files, and each of the plurality of partition files includes a deleted file designation.

At operation 1204, a recovery process of the plurality of partition files is performed based on the request, to obtain recovered partition files. An example recovery process is discussed in connection with FIG. 10.

At operation 1206, a schema associated with the historical table data is retrieved.

At operation 1208, metadata corresponding to the retrieved schema is generated (e.g., in the form of one or more metadata files).

At operation 1210, the metadata is associated with the recovered partition files to recover the historical table data. This can be performed as a metadata operation (e.g., cloning), without copying the underlying table data.

Figure 13:
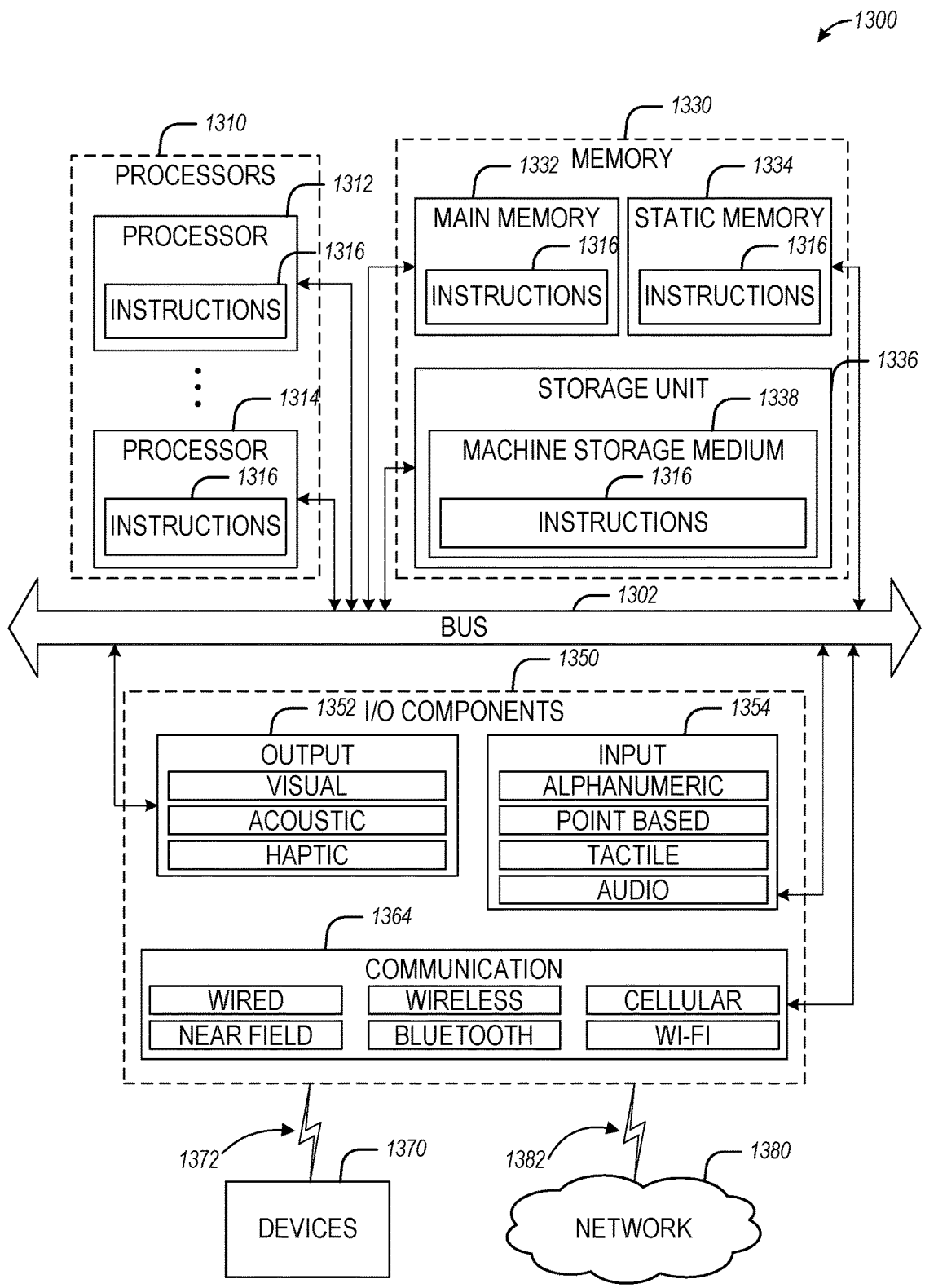
FIG. 13 illustrates a diagrammatic representation of a machine in the form of a computer system within which a set of instructions may be executed for causing the machine to perform any one or more of the methodologies discussed herein, according to some example embodiments.

FIG. 13 illustrates a diagrammatic representation of machine 1300 in the form of a computer system within which a set of instructions may be executed for causing machine 1300 to perform any one or more of the methodologies discussed herein, according to an example embodiment. Specifically, FIG. 13 shows a diagrammatic representation of machine 1300 in the example form of a computer system, within which instructions 1316 (e.g., software, a program, an application, an applet, an app, or other executable code) for causing the machine 1300 to perform any one or more of the methodologies discussed herein may be executed. For example, instructions 1316 may cause machine 1300 to execute any one or more operations of method 1200 (or any other technique discussed herein, for example in connection with FIG. 4-FIG. 12). As another example, instructions 1316 may cause machine 1300 to implement one or more portions of the functionalities discussed herein. In this way, instructions 1316 may transform a general, non-programmed machine into a particular machine 1300 (e.g., the client device 114, the compute service manager 108, or a node in the execution platform 110) that is specially configured to carry out any one of the described and illustrated functions in the manner described herein. In yet another embodiment, instructions 1316 may configure the client device 114, the compute service manager 108, and/or a node in the execution platform 110 to carry out any one of the described and illustrated functions in the manner described herein, which functions can be configured or performed by the DR manager 132.

In alternative embodiments, the machine 1300 operates as a standalone device or may be coupled (e.g., networked) to other machines. In a networked deployment, machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

Machine 1300 includes processors 1310, memory 1330, and input/output (I/O) components 1350 configured to communicate with each other such as via a bus 1302. In some example embodiments, the processors 1310 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1312 and a processor 1314 that may execute the instructions 1316. The term "processor" is intended to include multi-core processors 1310 that may comprise two or more independent processors (sometimes referred to as "cores") that may execute instructions 1316 contemporaneously. Although FIG. 13 shows multiple processors 1310, machine 1300 may include a single processor with a single core, a single processor with multiple cores (e.g., a multi-core processor), multiple processors with a single core, multiple processors with multiple cores, or any combination thereof.

The memory 1330 may include a main memory 1332, a static memory 1334, and a storage unit 1336, all accessible to the processors 1310 such as via the bus 1302. The main memory 1332, the static memory 1334, and the storage unit 1336 stores the instructions 1316 embodying any one or more of the methodologies or functions described herein. The instructions 1316 may also reside, completely or partially, within the main memory 1332, within the static memory 1334, within machine storage medium 1338 of the storage unit 1336, within at least one of the processors 1310 (e.g., within the processor's cache memory), or any suitable combination thereof, during execution thereof by the machine 1300.

The I/O components 1350 include components to receive input, provide output, produce output, transmit information, exchange information, capture measurements, and so on. The specific I/O components 1350 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example, communication components 1364 may include a network interface component or another suitable device to interface with network 1380. In further examples, communication components 1364 may include wired communication components, wireless communication components, cellular communication components, and other communication components to provide communication via other modalities. The device 1370 may be another machine or any of a wide variety of peripheral devices (e.g., a peripheral device coupled via a universal serial bus (USB)). For example, as noted above, machine 1300 may correspond to any one of the client devices 114, the compute service manager 108, or the execution platform 110, and device 1370 may include the client device 114 or any other computing device described herein as being in communication with the network-based database system 102 or the cloud storage platform 104.

The various memories (e.g., 1330, 1332, 1334, and/or memory of the processor(s) 1310 and/or the storage unit 1336) may store one or more sets of instructions 1316 and data structures (e.g., software) embodying or utilized by any one or more of the methodologies or functions described herein. These instructions 1316, when executed by the processor(s) 1310, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1380 may be an ad hoc network, an intranet, an extranet, a virtual private network (VPN), a local-area network (LAN), a wireless LAN (WLAN), a wide-area network (WAN), a wireless WAN (WWAN), a metropolitanarea network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, network 1380 or a portion of network 1380 may include a wireless or cellular network, and coupling 1382 may be a Code Division Multiple Access (CDMA) connection, a Global System for Mobile communications (GSM) connection, or another type of cellular or wireless coupling. In this example, the coupling 1382 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1316 may be transmitted or received over the network 1380 using a transmission medium via a network interface device (e.g., a network interface component included in the communication components 1364) and utilizing any one of several well-known transfer protocols (e.g., hypertext transfer protocol (HTTP)). Similarly, instructions 1316 may be transmitted or received using a transmission medium via coupling 1372 (e.g., a peer-to-peer coupling or another type of wired or wireless network coupling) to device 1370. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1316 for execution by the machine 1300, and includes digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: decoding a request to recover historical table data, the request received from an account of a data provider, the historical table data comprising a plurality of partition files, and each of the plurality of partition files including a deleted file designation; performing based on the request, a recovery process of the plurality of partition files to obtain recovered partition files; retrieving a schema associated with the historical table data; generating metadata corresponding to the retrieved schema; and associating the metadata with the recovered partition files to recover the historical table data.

In Example 2, the subject matter of Example 1 includes operations associated with decoding the request during a failsafe period associated with the account of the data provider, the failsafe period corresponding to a duration during which the plurality of partition files are inaccessible by the data provider.

In Example 3, the subject matter of Example 2 includes subject matter where the schema is a latest schema available before a beginning time instance of the failsafe period.

In Example 4, the subject matter of Examples 2-3 includes operations associated with performing a verification the account of the data provider is authorized to generate the request to recover the historical table data based on at least one secure credential associated with sending the request.

In Example 5, the subject matter of Example 4 includes operations associated with initiating the recovery process when the verification is successful and the failsafe period has not expired.

In Example 6, the subject matter of Examples 1-5 includes subject matter where the operations for performing the recovery process further comprise generating a temporary table using the retrieved schema associated with the historical table data.

In Example 7, the subject matter of Example 6 includes operations associated with retrieving a plurality of active metadata files associated with the historical table data.

In Example 8, the subject matter of Example 7 includes operations associated with parsing the plurality of active metadata files to determine the plurality of partition files forming the historical table data.

In Example 9, the subject matter of Example 8 includes operations associated with placing a lock on previously scheduled deletions of at least one of the plurality of partition files.

In Example 10, the subject matter of Example 9 includes operations associated with removing the deleted file designation from each of the plurality of partition files to complete the recovery process.

Example 11 is a method comprising: decoding, by at least one hardware processor, a request to recover historical table data, the request received from an account of a data provider, the historical table data comprising a plurality of partition files, and each of the plurality of partition files including a deleted file designation; performing based on the request, a recovery process of the plurality of partition files to obtain recovered partition files; retrieving a schema associated with the historical table data; generating metadata corresponding to the retrieved schema; and associating the metadata with the recovered partition files to recover the historical table data.

In Example 12, the subject matter of Example 11 includes, decoding the request during a failsafe period associated with the account of the data provider, the failsafe period corresponding to a duration during which the plurality of partition files are inaccessible by the data provider.

In Example 13, the subject matter of Example 12 includes subject matter where the schema is a latest schema available before a beginning time instance of the failsafe period.

In Example 14, the subject matter of Examples 12-13 includes, performing a verification the account of the data provider is authorized to generate the request to recover the historical table data based on at least one secure credential associated with sending the request.

In Example 15, the subject matter of Example 14 includes, initiating the recovery process when the verification is successful and the failsafe period has not expired.

In Example 16, the subject matter of Examples 11-15 includes subject matter where the performing of the recovery process further comprises: generating a temporary table using the retrieved schema associated with the historical table data.

In Example 17, the subject matter of Example 16 includes, retrieving a plurality of active metadata files associated with the historical table data.

In Example 18, the subject matter of Example 17 includes, parsing the plurality of active metadata files to determine the plurality of partition files forming the historical table data.

In Example 19, the subject matter of Example 18 includes, placing a lock on previously scheduled deletions of at least one of the plurality of partition files.

In Example 20, the subject matter of Example 19 includes, removing the deleted file designation from each of the plurality of partition files to complete the recovery process.

Example 21 is a computer-storage medium comprising instructions that, when executed by one or more processors of a machine, configure the machine to perform operations comprising: decoding, by at least one hardware processor, a request to recover historical table data, the request received from an account of a data provider, the historical table data comprising a plurality of partition files, and each of the plurality of partition files including a deleted file designation; performing based on the request, a recovery process of the plurality of partition files to obtain recovered partition files; retrieving a schema associated with the historical table data; generating metadata corresponding to the retrieved schema; and associating the metadata with the recovered partition files to recover the historical table data.

In Example 22, the subject matter of Example 21 includes operations associated with decoding the request during a failsafe period associated with the account of the data provider, the failsafe period corresponding to a duration during which the plurality of partition files are inaccessible by the data provider.

In Example 23, the subject matter of Example 22 includes subject matter where the schema is a latest schema available before a beginning time instance of the failsafe period.

In Example 24, the subject matter of Examples 22-23 includes operations associated with performing a verification the account of the data provider is authorized to generate the request to recover the historical table data based on at least one secure credential associated with sending the request.

In Example 25, the subject matter of Example 24 includes operations associated with initiating the recovery process when the verification is successful and the failsafe period has not expired.

In Example 26, the subject matter of Examples 21-25 includes subject matter where the operations for performing the recovery process further comprise generating a temporary table using the retrieved schema associated with the historical table data.

In Example 27, the subject matter of Example 26 includes operations associated with retrieving a plurality of active metadata files associated with the historical table data.

In Example 28, the subject matter of Example 27 includes operations associated with parsing the plurality of active metadata files to determine the plurality of partition files forming the historical table data.

In Example 29, the subject matter of Example 28 includes operations associated with placing a lock on previously scheduled deletions of at least one of the plurality of partition files.

In Example 30, the subject matter of Example 29 includes operations associated with removing the deleted file designation from each of the plurality of partition files to complete the recovery process.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to perform operations comprising:
   decoding a request to recover historical table data of a source table, the request received at a computing node from an account of a data provider, the historical table data comprising a plurality of partition files, and each of the plurality of partition files including a deleted file designation;
   performing based on the request, a recovery process of the plurality of partition files to obtain recovered partition files, the recovery process comprising:
   parsing lifecycle information of the source table to determine a threshold period of the source table, the threshold period being prior to a current timestamp associated with reception of the request;
   determining a failsafe recoverable time range based on the threshold period and the current timestamp; and
   executing an undelete system function at the computing node to generate the recovered partition files based on a timestamp of the historical table data being within the failsafe recoverable time range;
   retrieving a schema associated with the historical table data;
   generating metadata corresponding to the retrieved schema;
   associating the metadata with the recovered partition files to recover the historical table data; and
   encoding a notification for transmission to the account of the data provider, the notification indicating completion of recovery of the historical table data.

2. The system of claim 1, the operations further comprising:
   decoding the request during a failsafe period associated with the account of the data provider, the failsafe period corresponding to a duration during which the plurality of partition files are inaccessible by the data provider.

3. The system of claim 2, wherein the schema is a latest schema available before a beginning time instance of the failsafe period.

4. The system of claim 2, the operations further comprising:
   performing a verification on the account of the data provider to check if it is authorized to generate the request to recover the historical table data, the verification based on at least one secure credential associated with sending the request.

5. The system of claim 4, the operations further comprising:
   initiating the recovery process based on the verification being successful and the failsafe period not being expired.

6. The system of claim 1, wherein the operations for performing the recovery process further comprise:
   generating a temporary table using the retrieved schema associated with the historical table data.

7. The system of claim 6, the operations further comprising:
   retrieving a plurality of active metadata files associated with the historical table data.

8. The system of claim 7, the operations further comprising:
   parsing the plurality of active metadata files to determine the plurality of partition files forming the historical table data.

9. The system of claim 8, the operations further comprising:
   placing a lock on previously scheduled deletions of at least one of the plurality of partition files.

10. The system of claim 9, the operations further comprising:
    remove the deleted file designation from each of the plurality of partition files to complete the recovery process.

11. A method comprising:
    decoding, by at least one hardware processor, a request to recover historical table data of a source table, the request received at a computing node from an account of a data provider, the historical table data comprising a plurality of partition files, and each of the plurality of partition files including a deleted file designation;
    performing based on the request, a recovery process of the plurality of partition files to obtain recovered partition files, the recovery process comprising:
    parsing lifecycle information of the source table to determine a threshold period of the source table, the threshold period being prior to a current timestamp associated with reception of the request;
    determining a failsafe recoverable time range based on the threshold period and the current timestamp; and
    executing an undelete system function at the computing node to generate the recovered partition files based on a timestamp of the historical table data being within the failsafe recoverable time range;
    retrieving a schema associated with the historical table data;
    generating metadata corresponding to the retrieved schema;
    associating the metadata with the recovered partition files to recover the historical table data; and
    encoding a notification for transmission to the account of the data provider, the notification indicating completion of recovery of the historical table data.

12. The method of claim 11, further comprising:
    decoding the request during a failsafe period associated with the account of the data provider, the failsafe period corresponding to a duration during which the plurality of partition files are inaccessible by the data provider.

13. The method of claim 12, wherein the schema is a latest schema available before a beginning time instance of the failsafe period.

14. The method of claim 12, further comprising:
    performing a verification on the account of the data provider to check if it is authorized to generate the request to recover the historical table data, the verification based on at least one secure credential associated with sending the request.

15. The method of claim 14, further comprising:
initiating the recovery process based on the verification being successful and the failsafe period not being expired.

16. The method of claim 11, wherein the performing of the recovery process further comprises:
generating a temporary table using the retrieved schema associated with the historical table data.

17. The method of claim 16, further comprising:
retrieving a plurality of active metadata files associated with the historical table data.

18. The method of claim 17, further comprising:
parsing the plurality of active metadata files to determine the plurality of partition files forming the historical table data.

19. The method of claim 18, further comprising:
placing a lock on previously scheduled deletions of at least one of the plurality of partition files.

20. The method of claim 19, further comprising:
remove the deleted file designation from each of the plurality of partition files to complete the recovery process.

21. A computer-storage medium comprising instructions that, when executed by one or more processors of a machine, configure the machine to perform operations comprising:
decoding, by at least one hardware processor, a request to recover historical table data of a source table, the request received at a computing node from an account of a data provider, the historical table data comprising a plurality of partition files, and each of the plurality of partition files including a deleted file designation;
performing based on the request, a recovery process of the plurality of partition files to obtain recovered partition files, the recovery process comprising:
parsing lifecycle information of the source table to determine a threshold period of the source table, the threshold period being prior to a current timestamp associated with reception of the request;
determining a failsafe recoverable time range based on the threshold period and the current timestamp; and
executing an undelete system function at the computing node to generate the recovered partition files based on a timestamp of the historical table data being within the failsafe recoverable time range;
retrieving a schema associated with the historical table data;
generating metadata corresponding to the retrieved schema;
associating the metadata with the recovered partition files to recover the historical table data; and
encoding a notification for transmission to the account of the data provider, the notification indicating completion of recovery of the historical table data.

22. The computer-storage medium of claim 21, the operations further comprising:
decoding the request during a failsafe period associated with the account of the data provider, the failsafe period corresponding to a duration during which the plurality of partition files are inaccessible by the data provider.

23. The computer-storage medium of claim 22, wherein the schema is a latest schema available before a beginning time instance of the failsafe period.

24. The computer-storage medium of claim 22, the operations further comprising:
performing a verification on the account of the data provider to check if it is authorized to generate the request to recover the historical table data, the verification based on at least one secure credential associated with sending the request.

25. The computer-storage medium of claim 24, the operations further comprising:
initiating the recovery process based on the verification being successful and the failsafe period not being expired.

26. The computer-storage medium of claim 21, wherein the operations for performing the recovery process further comprise:
generating a temporary table using the retrieved schema associated with the historical table data.

27. The computer-storage medium of claim 26, the operations further comprising:
retrieving a plurality of active metadata files associated with the historical table data.

28. The computer-storage medium of claim 27, the operations further comprising:
parsing the plurality of active metadata files to determine the plurality of partition files forming the historical table data.

29. The computer-storage medium of claim 28, the operations further comprising:
placing a lock on previously scheduled deletions of at least one of the plurality of partition files.

30. The computer-storage medium of claim 29, the operations further comprising:
remove the deleted file designation from each of the plurality of partition files to complete the recovery process.

* * * * *